US009292490B2

United States Patent
Kimelfeld et al.

(10) Patent No.: US 9,292,490 B2
(45) Date of Patent: Mar. 22, 2016

(54) UNSUPERVISED LEARNING OF DEEP PATTERNS FOR SEMANTIC PARSING

(71) Applicant: International Business Machines Corporation, Armonk, NY (US)

(72) Inventors: Benny Kimelfeld, Santa Clara, CA (US); Shivakumar Vaithyanathan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 13/968,462

(22) Filed: Aug. 16, 2013

(65) Prior Publication Data

US 2015/0051900 A1     Feb. 19, 2015

(51) Int. Cl.
*G06F 17/27*     (2006.01)

(52) U.S. Cl.
CPC .......... *G06F 17/2785* (2013.01); *G06F 17/271* (2013.01); *G06F 17/2705* (2013.01); *G06F 17/2775* (2013.01)

(58) Field of Classification Search
CPC   G06F 17/2705; G06F 17/2785; G06F 17/271
USPC .......................................................... 704/9
See application file for complete search history.

(56) References Cited

U.S. PATENT DOCUMENTS

| | | | |
|---|---|---|---|
| 5,406,480 A | 4/1995 | Kanno | |
| 6,745,161 B1 | 6/2004 | Arnold et al. | |
| 7,016,829 B2 | 3/2006 | Brill et al. | |
| 7,383,169 B1 | 6/2008 | Vanderwende et al. | |
| 8,180,633 B2 | 5/2012 | Collobert et al. | |
| 2005/0267871 A1* | 12/2005 | Marchisio et al. | 707/3 |
| 2010/0235165 A1 | 9/2010 | Todhunter et al. | |
| 2011/0238408 A1 | 9/2011 | Larcheveque et al. | |

OTHER PUBLICATIONS

Abend et al., "Unsupervised Argument Identification for Semantic Role Labeling", Institute of Computer Science, ICNC, Hebrew University of Jerusalem, provided by Inventor Jul. 11, 2013.
Chen et al., "Mining Maximal Frequently Changing Subtree Patterns from XML Documents", School of Computer Engineering, Nanyang Technological University, Singapore.
Chi et al., "Frequent Subtree Mining—An Overview", Fundamenta Informaticae XXI (2001) 1001-1038, IOS Press.
Das et al., Identifying Emotion Topic—An Unsupervised Hybrid Approach with Rhetorical Structure and Heuristic Classifier, 2010 Intl Conf on Natural Language Processing and Knowledge Engineering, Aug. 21-23, 2010, Beijing, China, DOI: 10.1109/NLPKE.2010. 5587777, Copyright 2010 IEEE.
Giuglea, et al., "Semantic Role Labeling via FrameNet, VerbNet and PropBank", Department of Computer Science, University of Rome, "Tor Vergata", Rome, Italy, provided by Inventor Jul. 11, 2013.

(Continued)

*Primary Examiner* — Shaun Roberts
(74) *Attorney, Agent, or Firm* — David B. Woycechowsky

(57) ABSTRACT

Using exemplary sentences, usage patterns and thematic roles ascribed in VerbNet to generate "deep pattern trees" for the exemplary sentences. Then, when an arbitrary natural language subject sentence is input, these deep pattern trees can be matched to the natural language subject sentence in order to assign thematic roles to at least some of the "grammatical portions" of the natural language subject sentence.

9 Claims, 5 Drawing Sheets

(56) References Cited

OTHER PUBLICATIONS

Hartrumpf et al., "SemDupl: Semantic-based Duplicate Identification", Informatik Berichte, 359—Jul. 2011, FernUniversität in Hagen, Fakultät für Mathematik und Informatik, Postfach 940, D-58084 Hagen.

Kimelfeld et al., "The Complexity of Mining Maximal Frequent Subgraphs", PODS '13, Jun. 22-27, 2013, New York, NY, USA, Copyright 2013 ACM, pp. 13-24.

Lang et al., "Unsupervised Semantic Role Induction with Graph Partitioning", Proceedings of the 2011 Conference of Empirical Methods in Natural Language Processing, pp. 1320-1331, Edinburg, Scotland, UK, Jul. 27-31, 2011, Copyright 2011 Association for Computational Linguistics.

Loper et al., "Combining Lexical Resources: Maping Between PropBank and VerbNet", pp. 1-12, provided by inventor Jul. 11, 2013.

Paik et al., "Fast Extraction of Maximal Frequent Subtrees Using Bits Representation", revised Nov. 28, 2007; pp. 435-464, Journal of Information Science and Engineering 25, (2009).

Palmer et al., "Semantic Role Labeling", Synthesis Lectures on Human Language Technologies, 2010, doi:10.2200/S00239ED1V01Y200912HLT006.

Poon, et al., "Unsupervised Semantic Parsing", Department of Computer Science and Engineering, University of Washington, Seattle, WA, USA, 2009.

Roa et al., "Mapping between Compositional Semantic Representations and Lexical Semantic Resources: Towards Accurate Deep Semantic Parsing", Proceedings of ACL-08: HLT, Short Papers (Companion Volume), pp. 189-192, Columbus, Ohio, USA, Jun. 2008, Copyright 2008 Association for Computational Linguistics.

Schuler, Karin K., "VerbNet: A Broad-Coverage, Comprehensive Verb Lexicon", A Dissertation in Computer and Information Science, Presented to the Faculties of the University of Pennsylvania in Partial Fulfillment of the Requirements for the Degree of Doctor of Philosophy, 2005.

Shi et al., "Putting Pieces Together: Combining FrameNet, VerbNet and WordNet for Robust Semantic Parsing", CICLing 2005, LNCS 3406, pp. 100-111, 2005, Copyright Springer-Verlag Berlin Heidelberg 2005.

Xiao et al., "Efficient Data Mining for Maximal Frequent Subtrees", This material is based upon work supported by the National Science Foundation under Grant No. IIS-9820841 and IIS-02808741, 2003.

"VerbNet", Wikipedia, the free encyclopedia, page last modified on Apr. 13, 2013 at 11:26, <http://en.wikipedia.org/wiki/VerbNet>.

\* cited by examiner

UNSUPERVISED LEARNING OF DEEP PATTERNS FOR SEMANTIC PARSING

FIELD OF THE INVENTION

The present invention relates generally to the field of semantic parsing, and more particularly to semantic parsing using a VerbNet corpus.

BACKGROUND OF THE INVENTION

It is known to parse natural language text sentences into trees and sub-trees where the different parts (and sub-parts) of a sentence (herein called grammatical portions) respectively correspond to a set of hierarchically-related nodes. In this context, frequent sub-trees are trees that tend to occur frequently in text (that is, spoken text, written text, etc.). A "maximally frequent sub-tree" is a "frequent sub-tree" that has no proper supertrees which are also frequent.

The VerbNet project maps PropBank verb types to their corresponding Levin classes. VerbNet is a lexical resource that incorporates both semantic and syntactic information about language. VerbNet is part of the SemLink project in development at the University of Colorado. VerbNet includes the following: (i) a set of usage patterns; (ii) a set of exemplary natural language sentences for each usage pattern; and (iii) assignments of "thematic roles" for at least some of the phrases (that is, a word or short string of consecutive words) in each exemplary natural language sentence. The thematic roles are the arguments of verbs. Just like a method in a programming language, a verb is associated with arguments, each has a meaningful type. The common thematic roles are "agent" (subject; who is driving the action?), "theme" (object; what is the target of the operation), recipient (who is the target of path verbs like give send, receive, deliver, etc.). As an example, "I gave my friend an apple" has the thematic roles "agent" (I), "theme" ("an apple") and "recipient" ("my friend").

Semantic parsing is a known technique which is herein defined as associating parts of a given natural-language text with semantic concepts and/or relationships of a predefined domain and/or schema. One known type of semantic parsing is associating verbs with their arguments. In turn, this type of semantic parsing can enhance various text-analysis tasks, such as extracting SVO (subject-verb-object triplet) relations from text. The VerbNet corpus is known corpus that contains a thorough list of English language verbs, classified to verb classes, where a class is associated with different thematic roles. A class is also associated with different shallow patterns (for example, NP V NP NP" as in "I gave her a gift," where NP stands for Noun Phrase and V stands for verb) which will herein be referred to as "VerbNet patterns." In a VerbNet pattern each item of the pattern is respectively assigned a unique thematic role (for example, NP1=Sender, NP2=Recipient, NP3=Target). However, due to grammatical variations in the language, it is often not easy to correctly detect the pattern inherent in a given sentence. An example is the pattern NP V NP NP, which is inherent in the sentence "I will visit her tomorrow and give her this lovely gift."

VerbNet patterns are herein referred to as "shallow patterns" because the pre-existing patterns that are in the VerbNet corpus only reflect a two level hierarchy, as follows: (i) sentence level (also called root level); and (ii) grammatical portions level (for example, leaf nodes of NP, V, NP and NP for the "I gave her a gift" example used above).

In this document, the term "language net" will be used to generically refer to any software-based lexical resource that includes: (i) a set of usage patterns; (ii) a set of exemplary natural language sentences for each usage pattern; and (iii) assignments of "thematic roles" for at least some of the phrases (that is, a word or short string of consecutive words) in each exemplary natural language sentence. The VerbNet corpus is one example of a "language net."

SUMMARY

According to three aspects of the present invention, there are a method, system and computer program product for performing the following actions (not necessarily in the following order): (i) receiving a set of exemplary sentences from a language net; (ii) parsing each of the exemplary sentences, including a first exemplary sentence, to yield a set of training constituency trees respectively corresponding to the exemplary sentences; (iii) performing maximal frequent subtree analysis on the set of training constituency trees to yield a set of at least one deep pattern tree(s) including a first deep pattern tree corresponding to the first exemplary sentence; and (iv) assigning a first thematic role to a first node of the first deep pattern tree based on a thematic role assigned to a corresponding portion of the first exemplary sentence by the language net. Each deep pattern tree is a constituency tree having a multiple layer hierarchy of nodes respectively corresponding to grammatical portions of a corresponding exemplary sentence from the language net. At least the parsing step is performed by computer software running on computer hardware.

DETAILED DESCRIPTION

Figure 1:
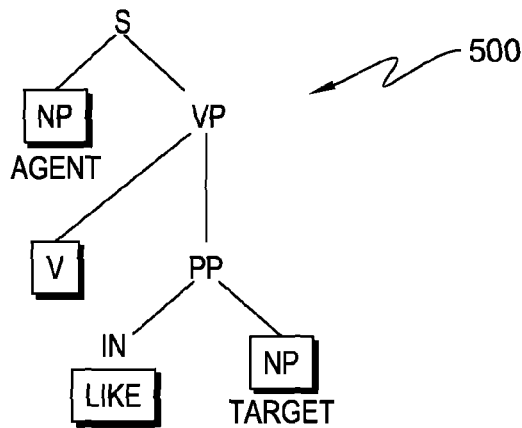
FIG. 1 is a first parse tree for use in the present invention.

This Detailed Description section is divided into the following sub-sections: (i) Embodiments and General Discussion; (ii) The Hardware and Software Environment for a Further Embodiment; (iii) Further Embodiment; and (iv) Definitions.

I. Embodiments and General Discussion

The present invention recognizes that there is need for a fully automatic tool to match and align a given sentence with a proper "deep pattern" derived from a language net, such as VerbNet in order to allow assignment of thematic roles to phrase(s) in the sentence. Some embodiments of the present disclosure provide a tool to match and/or align a given "sentence" (see definition, below, in Definitions sub-section) with the proper deep pattern that has been derived from VerbNet. Some embodiments of the present disclosure provide an implementation of an algorithm that operates over the VerbNet corpus.

Some aspects of an embodiment of an algorithm for converting VerbNet example sentences into deep patterns will now be discussed. The output of the algorithm is a set of "deep patterns" (also may be called "tree patterns" or "deep pattern trees"). The deep patterns are constituency trees (also called parse trees) with a multiple layer hierarchy of nodes corresponding to "grammatical portions" (for example, noun phrase, verb phrase, adverbial phrase, participle phrase, etc.), where at least some of the nodes of the deep pattern tree are assigned thematic roles. In some embodiments, the grammatical portions will be assigned according to the TreeBank scheme of grammatical labels.

After the deep pattern trees are established, natural language sentences can be queried against these deep patterns in order to: (i) find a deep pattern that matches the subject sentence; and (ii) assign thematic role(s) from node(s) of the matching deep pattern tree to phrase(s) in the subject sentence. In this way, thematic roles can be determined automatically, and by software, for new and arbitrary natural language sentences. Systems and methods according to the present disclosure may be used as a first step in higher-level "Information Extraction" tasks, and there is a plethora of such applications. For example, detect intent to travel: find sentences with the verb "travel" (or a variation) such that the location is "Mexico"; sentiment analysis: find sentences with the verb "like" (or a variation) such that the theme is "ipad 2". (Note: the term(s) "IPAD 2" may be subject to trademark rights in various jurisdictions throughout the world and are used here only in reference to the products or services properly denominated by the marks to the extent that such trademark rights may exist).

The constituency tree of a sentence can be obtained, automatically and by "parser" software, from standard parsers like the OpenNLP Parser or the Stanford Parser. An embodiment of a method according to the present invention is as follows (steps not necessarily performed in the following order): (i) obtain a subject sentence (in natural language); (ii) parse the subject sentence to obtain a corresponding subject sentence constituency tree T; (iii) obtain a set of deep pattern trees D1, D2, D3, . . . Dn, with each deep pattern tree being based on an analysis of VerbNet example sentences; (iv) match subject sentence constituency tree T to the most closely matching deep pattern tree Dm from the set of deep pattern trees D1, D2, D3, . . . Dn; (v) once matching deep pattern Dm is found, determine the association between thematic roles in deep pattern tree Dm and the corresponding natural language phrases in the natural language subject sentence of subject constituency tree T.

Figure 2:
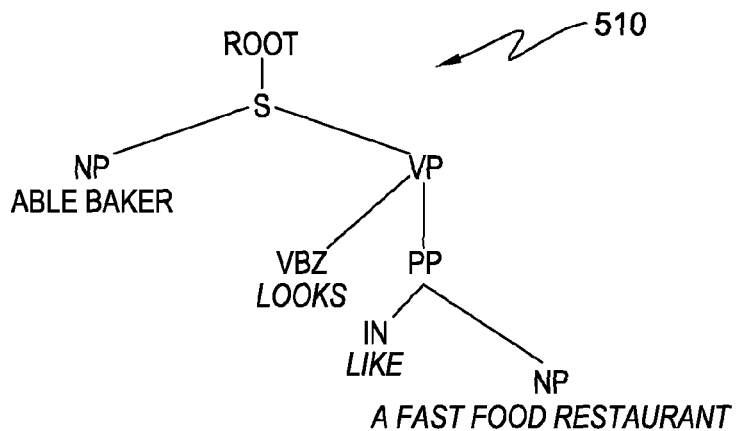
FIG. 2 is a second parse tree for use in the present invention.
Figure 3:
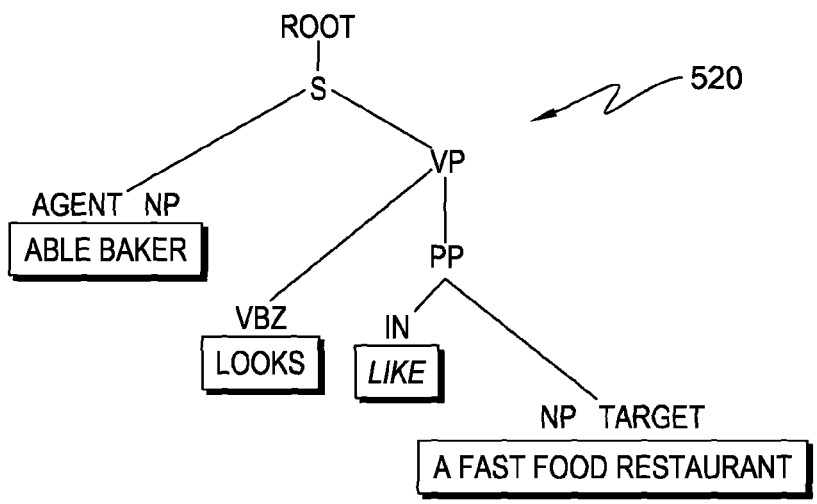
FIG. 3 is a third parse tree for use in the present invention.

As a more detailed example: (i) consider the VerbNet pattern: NP[Agent] V "like" NP[Target] (where [Agent] and [Target] are assigned thematic roles); (ii) an example of one corresponding deep pattern tree corresponding to this shallow pattern is shown in deep pattern tree 500 of FIG. 1; (iii) a subject sentence is now provided (specifically, "Able Baker looks like a fast food restaurant"); (iv) the subject sentence is parsed by a software-based parser to obtain constituency tree 510 shown in FIG. 2; (v) deep pattern tree 500 is a match for subject sentence constituency tree 510; and (vi) this match between trees 500 and 510 means that thematic roles of deep pattern tree 500 can be assigned to phrases of the subject sentence as shown in match tree 520 of FIG. 3 (which match tree includes both the natural language words of the subject sentence and the thematic roles of the deep pattern tree).

The VerbNet corpus assigns an example sentence to each verb class and VerbNet pattern. In some embodiments of the present disclosure, these VerbNet exemplary sentences are used as a basis for generating a set of deep pattern trees. Moreover, with the help of a linguistic parser, variants are created out of each VerbNet exemplary sentence. Given a collection of exemplary VerbNet sentences respectively assigned to the same VerbNet pattern in the VerbNet corpus, each of these exemplary sentences is parsed to obtain a respective constituency tree. The deep pattern tree are based on these constituency trees, although these constituency trees may be culled and/or otherwise processed (as will be discussed below) before they are suitable for use as deep pattern trees.

Ideally, the sought deep pattern would be a common substructure across all the constituency trees constructed above. But it is rarely the case in practice, for two main reasons. First, there could be more than one deep pattern realizing the same VerbNet pattern. Second, the parser may fail to correctly parse a few of the examples, due to standard parser limitations. Hence, some embodiments of the present disclosure take a different approach.

In some embodiments, the deep pattern trees are culled from the constituency trees parsed from VerbNet example sentences by finding "maximal frequent subtrees," which are subtrees that: (i) occur in at least a predefined number of parses (called the threshold or the minimal frequency); and (ii) are maximal in the sense that one cannot extend them without falling below the minimal frequency. In some embodiments, these frequent subtrees are post-processed as follows: (i) invalid trees are filtered out; (ii) redundant parts are removed to get cleaner patterns; and (iii) nodes in the trees are assigned constituents of the VerbNet pattern, mainly based on the order of appearance.

A semantic-parsing component of the embodiment under discussion will now be discussed. In this embodiment, semantic parsing greatly simplifies development. A semantic-parser API is used to perform the parsing. Parsing example 1: (i) sentence="I'm thinking of buying a new tablet style computer; and (ii) parsing results: (a) Verb=buy, (b) category=get, (c) agent=I, (d) theme=a new tablet style computer, and (e) voice=wishful. Parsing example 2: (i) sentence="Not gonna buy the new tablet style computer"; and (ii) parsing results: (a) verb=buy, (b) category=get; (c) theme=the new tablet style computer, (d) voice=negative, future. Parsing example 3: (i) sentence="Able Baker looks like a fast food restaurant; and (ii) parsing results: (a) verb=look, (b) category=appear, (c) agent=Able Baker, and (d) predicate=a fast food restaurant. Parsing example 4: (i) sentence="I'm looking for a new bank"; (ii) parsing results: (a) verb=look, (b) category=search, (c) agent=I, (d) theme=a new bank, and (e) voice=positive.

The challenge of assigning thematic roles, automatically and by software, to natural language sentences will now be discussed with reference to two examples. Consider the following VerbNet pattern: NP[Agent]/VP/"like"/NP[Target]. The natural language sentence "Able Baker looks like a fast food restaurant" reads on this pattern in a relatively straightforward manner, such that it is relatively easy to determine that "Able Baker" has the thematic role of Agent and that "a fast food restaurant" has the thematic role of Target. In contrast, the natural language sentence "The bank branch remains and looks pretty much like a fast food restaurant" does not read on the VerbNet pattern in a relatively straightforward manner, such that it is relatively difficult to determine that "the bank branch" has the thematic role of Agent and that "a fast food restaurant" has the thematic role of Target.

Figure 4:
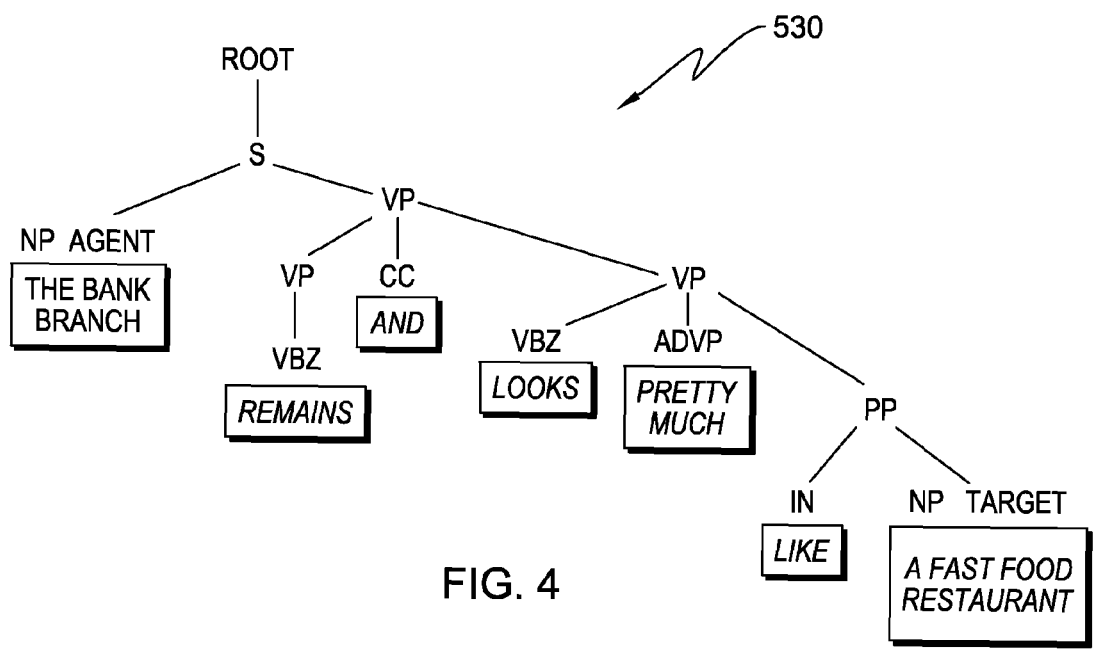
FIG. 4 is a fourth parse tree for use in the present invention.

FIG. 4 shows a subject natural language sentence that has been parsed into constituency tree 530 by a software-based parser (not shown). As shown in tree 530, the natural language sentence is as follows: "The bank branch remains and looks pretty much like a fast food restaurant." As mentioned above, it is difficult, or impossible, for conventional software to assign thematic roles to this type of sentence, despite the fact that the sentence can be parsed by conventional software as shown by tree 530. It is further noted that constituency tree 530 reflects a deep pattern, with more than one layer of nodes below the root level S. This kind of deep level tree does not currently exist in VerbNet. However, some embodiments of the present disclosure can generate deep pattern trees based on the exemplary sentences that are currently present in the VerbNet corpus. The constituency tree 530 of the subject sentence can then be queried, for a match, against these deep pattern trees generated from the VerbNet corpus. Some embodiments of the present disclosure use "deep" parsing as distinct from an approach known as Part Of Speech (POS) tagging, which is based upon a "shallow" parsing of the sentence. While there may be some embodiments of the present disclosure that use a POS approach (in addition to, or perhaps even as an alternative to) deeper parsing, a potential problem with the POS approach is incompleteness. On the other hand, deep parsing typically provides the information necessary to detect the thematic roles. For this reason, deep parsing may, in some embodiments, be a helpful feature, especially when handling complex sentences.

Figure 5:
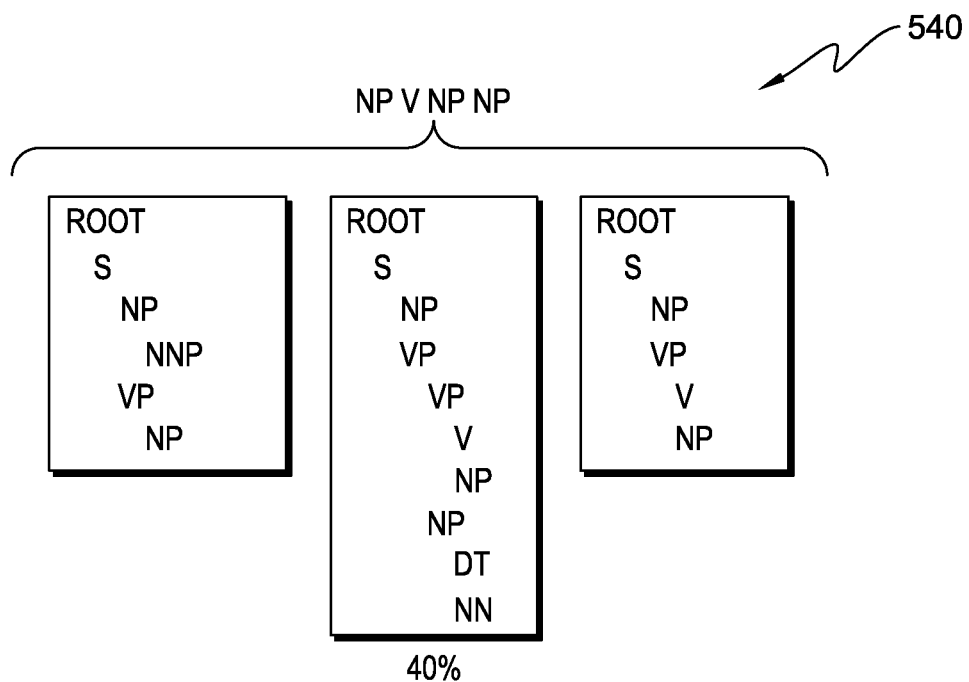
FIG. 5 is a first set of deep pattern tree table candidates for use in the present invention.
Figure 6:
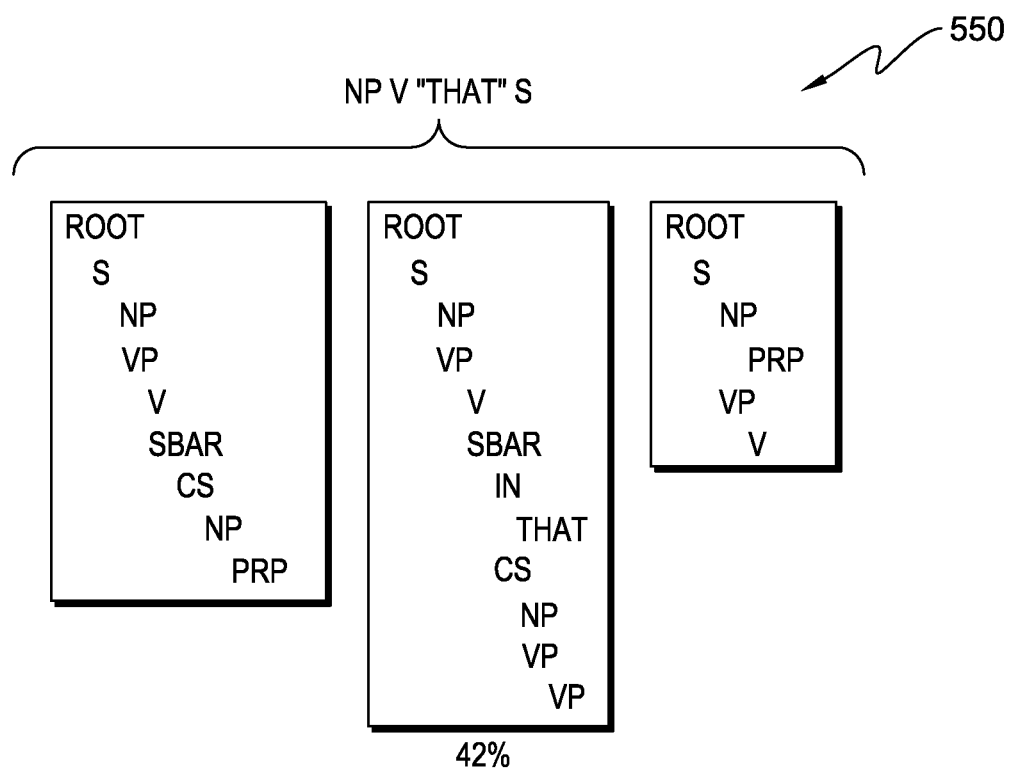
FIG. 6 is a second set of deep pattern tree table candidates for use in the present invention.

The process of generating the deep-level parse trees from the shallow patterns of the VerbNet corpus will now be discussed. An example of a shallow pattern in VerbNet is as follows: NP (noun phrase)/V (verb)/NP/NP. This pattern has at least three possible deep patterns as shown in diagram 540 of FIG. 5. In FIG. 5: DT=Determiner, and NN=Noun. In diagram 540, it is noted that the hierarchical relations are shown by a pattern of indentation, but this is equivalent to a tree diagram. As another example, FIG. 6 shows diagram 550, which shows three possible deep patterns for the following shallow VerbNet pattern: NP/V/"that"/CS (constituent sentence). In FIG. 6: S stands for "sentence" or "simple declarative clause." The 40% and 42% notations in diagrams 540 and 550 respectively indicate which deep patterns occur most frequently within the set of sentences that conform to their respectively associated shallow patterns.

An example of VerbNet XML code is given below:

```
<vnclass id="search-35.2">
    <members><member>check</member>...<member>watch</member>
    <frames>
        <frame>
            <examples>
                <example>I searched the cave for
                treasure.<example>
            </examples>
            <syntax>
                <np value="agent"/>
                <verb>
                <np value="location"/>
                <prep value="for"/>
                <np value="theme"/>
            <syntax>
        </frame>
        ⋮
        <frame>
        ⋮
        <frame>
    </frames>
</vnclass>
```

Some embodiments of the present disclosure, in order to generate deep patterns based on verbNet exemplary sentences, extract quadruples from VerbNet as follows: <verb, category, usage-pattern, example>. A more specific example of quadruple extraction follows:

<search, search, NP V NP "for" NP, I searched the cave for treasure>
<check, search, NP V NP "for" NP, I searched the cave for treasure>
•
<watch, search, NP V NP "for" NP, I searched the cave for treasure>

In some embodiments of the present disclosure, the ultimate goal is to match pattern components with spans of a given string, in order to, in turn, map thematic roles to spans. The following sentences each conform to the shallow pattern NP/V/NP: (i) John informed me; (ii) many small investors in Belgium store securities; (iii) he denied the horrid woman's statement; (iv) $50 will not even buy a dress; (v) George Washington established State University's linguistics department; and (vi) he estimated the probability of Don Quixote spontaneously combusting upon contact with the curry powder. The following sentences each conform to the shallow pattern NP/V/"that"/CS (constituent sentence): (i) I cannot impose that I get what I want; (ii) the defense also learned that college-educated people were uncharacteristically conservative; and (iii) he ordered that she should stop immediately.

In some embodiments of the present disclosure, language net (for example, VerbNet) patterns are translated into deep patterns suitable for being queried for a match based on deep patterns based upon software-based parsing of arbitrary subject sentences that are input to the system. In some embodiments, the deep patterns generated from exemplary sentences of the language net are translated into AQL rules in order to facilitate the querying process.

In some embodiments, at runtime the following method is performed: (i) parse the input sentence; (ii) identify the pattern; and (iii) determine the verb (type) and the actors of the thematic roles.

Some potential challenges are as follows: many patterns (VerbNet has more than 100 patterns); (ii) multiple variants for each pattern (including voice: negation, intention, desire, etc.); (iii) multiple translations for each pattern and/or variant; (iv) parser mistakes make it difficult, or impossible, to build on a small number of examples.

As mentioned above, some embodiments of the present disclosure learn deep patterns based on exemplary sentences from a language net. In some embodiments, "machine learning" is applied to automate the translation of language net shallow patterns, and associated language net exemplary sentences, into deep patterns for being queried against subject sentence constituency trees. For example, when exemplary sentences in VerbNet are used in this process, (i) exemplary sentences are associated with category-pattern pairs; and/or (ii) the system designer may need to take appropriate measures to handle ambiguity and/or parse mistakes. In some embodiments, deep patterns generated based on exemplary sentences in the language net are enhanced by variants, but the system designer may need to take appropriate measures to make sure that an unacceptable level of further noise is not produced.

In some embodiments, deep patterns are extracted based on the use of maximal frequent subtrees (MaxFS) selected from the parse trees of the exemplary sentences. For example, if the threshold is 35%, then the middle sub-tree of diagram 540 of FIG. 5 is a MaxFS because it occurs in 40% of the cases. Similarly, if the threshold is 35%, then the middle sub-tree of diagram 550 of FIG. 6 is a MaxFS because it occurs in 42% of the cases. It is noted that the threshold frequency c % can vary according to the choices of the system designer. It is also noted that, at least in this embodiment, "maximal" means maximal with respect to containment.

II. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 7:
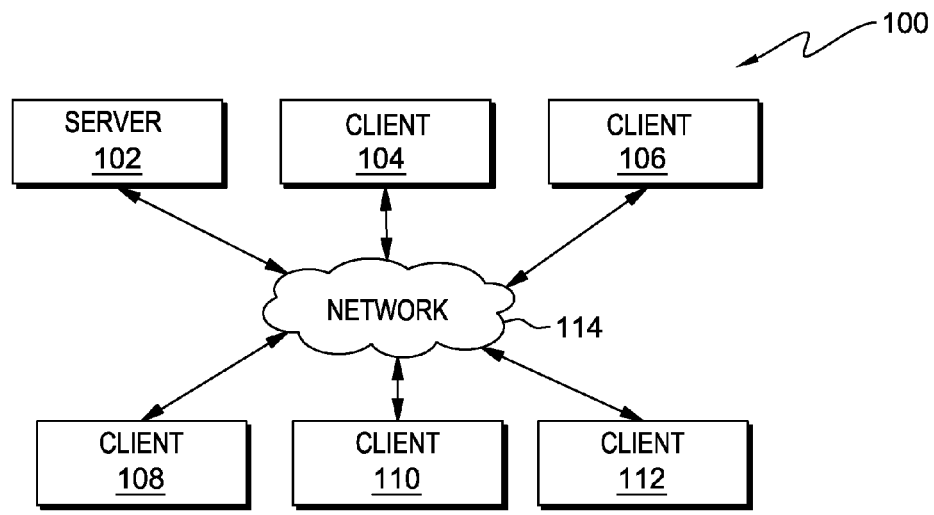
FIG. 7 is a schematic view of a first embodiment of a networked computer system according to the present invention.
Figure 8:
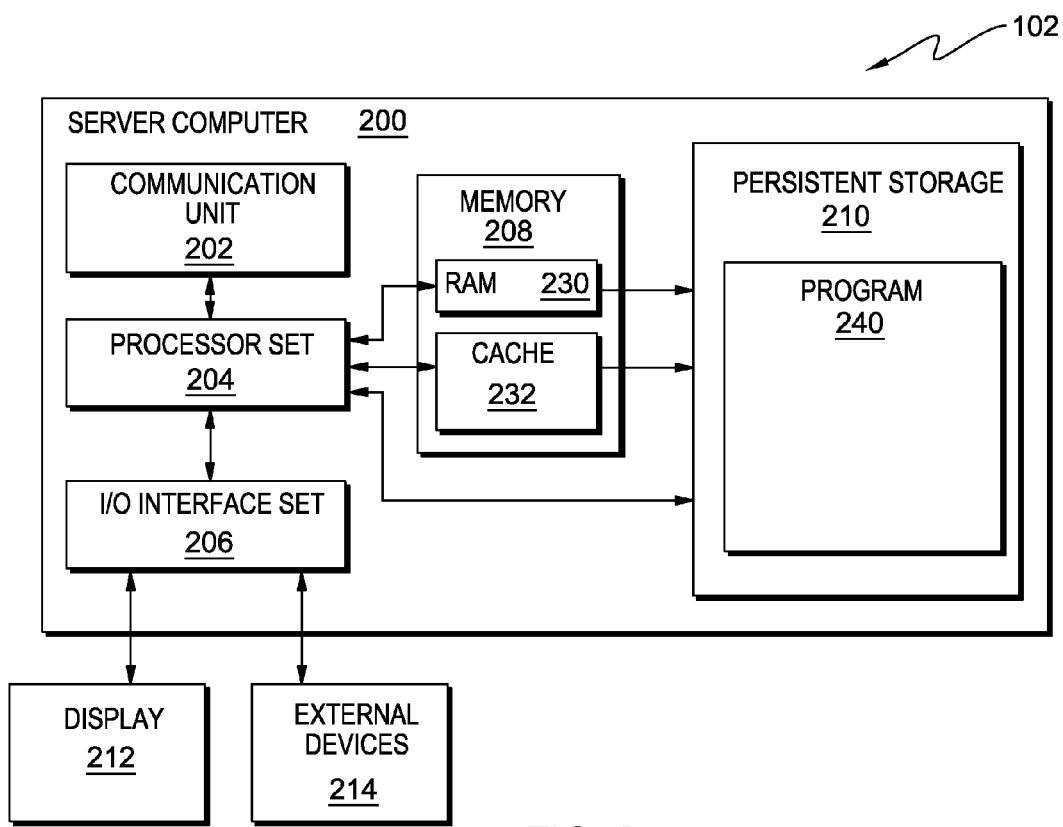
FIG. 8 is a schematic view of a server computer sub-system portion of the first embodiment networked computer system.

An embodiment of a possible hardware and software environment for software and/or methods according to the present invention will now be described in detail with reference to the Figures. FIGS. 7 and 8 collectively make up a functional block diagram illustrating various portions of distributed data processing system 100, including: server computer sub-system (that is, a portion of the larger computer system that itself includes a computer) 102; client computer sub-systems 104, 106, 108, 110, 112; communication network 114; server computer 200; communication unit 202; processor set 204; input/output (i/o) interface set 206; memory device 208; persistent storage device 210; display device 212; external device set 214; random access memory (RAM) devices 230; cache memory device 232; and program 240.

As shown in FIG. 8, server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 240 is a is a collection of machine readable instructions and/or data that is used to create, manage and control certain software functions that will be discussed in detail, below, in the Further Embodiment sub-section of this Detailed Description section.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 7 and 8, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 8, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

III. Further Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 9:
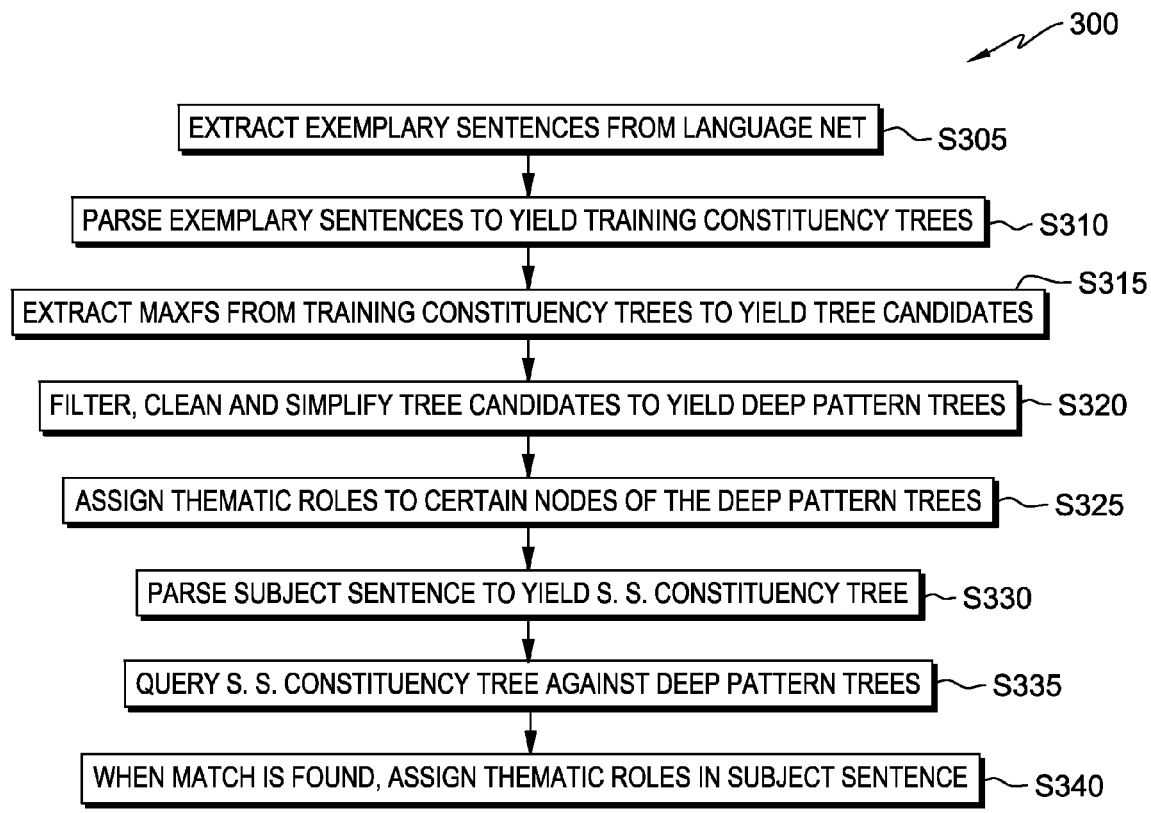
FIG. 9 is a flowchart showing a process performed, at least in part, by the first embodiment computer system.
Figure 10:
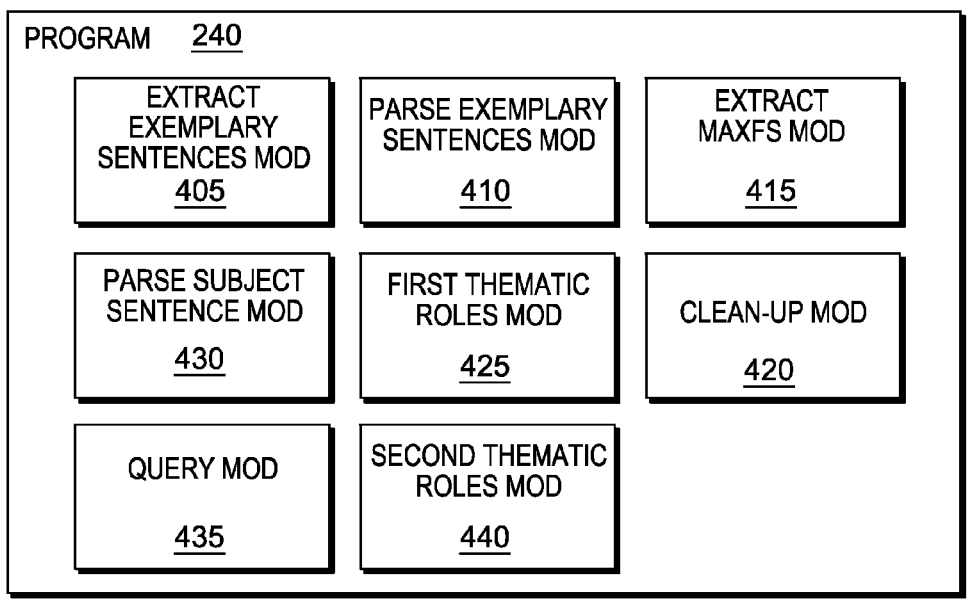
FIG. 10 is a schematic view of a portion of the first embodiment computer system.

FIG. 9 shows a flow chart 300 depicting a method according to the present invention. FIG. 10 shows program 240 for performing at least some of the method steps of flow chart 300. This method and associated software will now be discussed, over the course of the following paragraphs, with extensive reference to FIG. 9 (for the method step blocks) and FIG. 10 (for the software blocks).

Processing begins at step S305 where extract exemplary sentences module ("mod") extracts all exemplary sentences from VerbNet. The set of exemplary sentences are grouped into sub-sets by (shallow) pattern P1, P2, . . . , Pn.

Processing proceeds to step S310, where parse exemplary sentences mod 410 parses all of the sentences extracted at step S305 to yield respectively corresponding "training constituency trees." Conventional parsing software may be used to perform step S310. The training constituency tree will generally reflect deep patterns.

Processing proceeds to step S315, where extract maxFS mod 415 extracts maximal frequency sub-trees from the training constituency trees to yield "tree candidates." In this embodiment, the maximal frequency sub-tree analysis is done on a subtree by subtree basis. To put this in a more precise way, the frequent subtrees are the trees that are substructures of (that is, trees embedded in) sufficiently many (deep) parse trees, where "sufficiently many" is determined by a predefined threshold parameter.

Processing proceeds to step S320 where clean-up mod 420 filters, cleans and simplifies the tree candidates to yield deep pattern trees that can be queried against. For example, irrelevant trees may be filtered out if they do not include one of the parts of speech (or "grammatical portion" of the associated (shallow) usage pattern P1, P2, . . . , Pn. As a further example, redundant leaves may be deleted as part of the clean-up.

Processing proceeds to step S325 where first thematic roles mod 425 matches appropriate nodes of each deep pattern tree from step S320 to thematic roles in the pattern, P1, P2, . . . , Pn, respectively associated with the deep pattern tree. This can be done using simple rules, such as NP is mapped to NP, SINF is mapped to S, and so on. SINF may also be referred to as "SBAR", which stands for "subordinating conjunction," which means subsentences that start with "that," "which" or the like.

For each deep tree pattern tree, fully created at step S325, voice variants (negative, future, question, intent, etc.) may also be used to generate further deep pattern trees by repeating steps S310 to S325 for each variant.

Processing proceeds to step S330, where parse subject sentence mod 430 receives and parses a subject natural language sentence from an external source (not shown) to yield a subject sentence constituency tree. For example, the subject natural language sentence could be received through network 114 from one of the client sub-systems 104, 106, 108, 110, 112. The subject natural language sentence may ultimately come from all kinds of sources, such as literary works, website text, blog posts, song lyrics, student essays, transcribed spoken sentences, etc.

Processing proceeds to step S335 where query mod 435 uses the subject sentence constituency tree to query the deep pattern trees generated by steps S305 to step S325. In this example, only deep pattern trees for a (shallow) pattern, P1, P2, . . . , Pn are queries, based on the shallow pattern of the subject sentence.

Processing proceeds to step S340, where second thematic rules mod 440 assigns thematic roles to at least some grammatical portions of the natural language subject sentence based upon the matching deep pattern tree.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Software storage device: any device (or set of devices) capable of storing computer code in a manner less transient than a signal in transit; "software storage device" does not include: any device that stores computer code only as a signal; and/or a signal propagation media, such as a copper cable, optical fiber or wireless transmission media.

Tangible medium software storage device: any software storage device (see Definition, above) that stores the computer code in and/or on a tangible medium.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Sentence: any portion of text intended to be parsed as a sentence, regardless of punctuation, punctuation errors and/or grammatical correctness.

What is claimed is:

1. A method of unsupervised learning of deep patterns for semantic parsing, using an algorithm that operates over a VerbNet corpus, the method comprising:
receiving a set of exemplary sentences, including a first exemplary sentence, from a language net;
extracting, from VerbNet, a plurality of markup language files corresponding to a usage pattern P;
parsing each of the exemplary sentences to yield a set of training constituency trees respectively corresponding to the exemplary sentences;
performing maximal frequent subtree analysis on the set of training constituency trees to yield an unfiltered set of deep pattern trees; and
filtering at least one irrelevant tree(s) from the set of deep pattern trees to obtain a filtered set of deep pattern trees, with the at least one irrelevant tree(s) do not contain a part of speech that is included in the usage pattern P;
deleting redundant leaves from at least one of the following: the filtered set of deep pattern, and/or the unfiltered set of deep pattern trees; and
matching nodes of each tree pattern, of the filtered set of deep tree patterns, with items of the usage pattern P using machine logic based rules to facilitate translation of the filtered set of deep pattern trees into annotation query language rules;
At least the parsing step is performed by computer software running on computer hardware.

2. The method of claim 1 further comprising:
responsive to the matching of the nodes, translating the filtered set of deep pattern trees into annotation query language (AQL) rules.

3. The method of claim 1 wherein:
the language net organizes the exemplary sentences into a set of usage patterns; and
the performing maximal subtree analysis step is performed separately for each sub-set of training constituency trees respectively corresponding to each usage pattern in the language net.

4. A computer program product, for unsupervised learning of deep patterns for semantic parsing, using an algorithm that operates over a VerbNet corpus, the computer program product comprising software stored on a software storage device, the software comprising:
- first program instructions programmed to extract, from VerbNet, a plurality of markup language files corresponding to a usage pattern P;
- second program instructions programmed to parse each of the exemplary sentences to yield a set of training constituency trees respectively corresponding to the exemplary sentences;
- third program instructions programmed to perform maximal frequent subtree analysis on the set of training constituency trees to yield an unfiltered set of deep pattern trees; and
- fourth program instructions programmed to filter at least one irrelevant tree(s) from the set of deep pattern trees to obtain a filtered set of deep pattern trees, with the at least one irrelevant tree(s) do not contain a part of speech that is included in the usage pattern P;
- fifth program instructions programmed to delete redundant leaves from at least one of the following: the filtered set of deep pattern, and/or the unfiltered set of deep pattern trees; and
- sixth program instructions programmed to match nodes of each tree pattern, of the filtered set of deep tree patterns, with items of the usage pattern P using machine logic based rules to facilitate translation of the filtered set of deep pattern trees into annotation query language (AQL) rules.

5. The product of claim 4 wherein the software further comprises:
- seventh program instructions programmed to, responsive to the matching of the nodes, translate the filtered set of deep pattern trees into annotation query language (AQL) rules.

6. The product of claim 4 wherein:
- the language net organizes the exemplary sentences into a set of usage patterns; and
- the third program instructions are further programmed to perform maximal subtree analysis separately for each sub-set of training constituency trees respectively corresponding to each usage pattern in the language net.

7. A computer system for unsupervised learning of deep patterns for semantic parsing, using an algorithm that operates over a VerbNet corpus, the computer system comprising:
- a processor(s) set; and
- a software storage device;
- wherein:
- the processor set is structured, located, connected and/or programmed to run software stored on the software storage device; and
- the software comprises:
  - first program instructions programmed to extract, from VerbNet, a plurality of markup language files corresponding to a usage pattern P;
  - second program instructions programmed to parse each of the exemplary sentences to yield a set of training constituency trees respectively corresponding to the exemplary sentences;
  - third program instructions programmed to perform maximal frequent subtree analysis on the set of training constituency trees to yield an unfiltered set of deep pattern trees; and
  - fourth program instructions programmed to filter at least one irrelevant tree(s) from the set of deep pattern trees to obtain a filtered set of deep pattern trees, with the at least one irrelevant tree(s) do not contain a part of speech that is included in the usage pattern P;
  - fifth program instructions programmed to delete redundant leaves from at least one of the following: the filtered set of deep pattern, and/or the unfiltered set of deep pattern trees; and
  - sixth program instructions programmed to match the nodes of each tree pattern, of the filtered set of deep tree patterns, with items of the usage pattern P using machine logic based rules to facilitate translation of the filtered set of deep pattern trees into annotation query language (AQL) rules.

8. The system of claim 7 wherein the software further comprises:
- Seventh program instructions, responsive to the matching of the nodes, translate the filtered set of deep pattern trees into annotation query language (AQL) rules.

9. The system of claim 7 wherein:
- the language net organizes the exemplary sentences into a set of usage patterns; and
- the third program instructions are further programmed to perform maximal subtree analysis separately for each sub-set of training constituency trees respectively corresponding to each usage pattern in the language net.

* * * * *